Dec. 10, 1968   H. GOLDEN   3,415,550
VEHICLE STEERING ASSEMBLY
Filed May 6, 1966

INVENTOR.
HARRY GOLDEN
BY Jacobi & Davidson
ATTORNEYS.

United States Patent Office 3,415,550
Patented Dec. 10, 1968

3,415,550
VEHICLE STEERING ASSEMBLY
Harry Golden, New York, N.Y., assignor to Ideas for Auto and Bike Specialties, Inc., a corporation of New York
Filed May 6, 1966, Ser. No. 548,081
3 Claims. (Cl. 287—53)

ABSTRACT OF THE DISCLOSURE

An improvement in coupling a plastic steering member to a metal steering rod, such as that used on a small or toy vehicle, wherein the plastic steering column is provided with a central hub having a non-circular bore extending therethrough. A metal locking element is juxtaposed to each surface of the hub with each metal locking element having a non-circular aperture therein in alignment with the non-circular bore of the hub. The steering rod has a non-circular portion which projects through the apertures in the locking elements and the bore in the hub, and the projecting end of this steering rod portion is threaded to receive a nut. The steering rod also contains a metal abutment surface adjacent the non-circular portion so that as the locking nut is tightened against one of the metal locking elements, the other metal locking element is pressed against the abutment surface, thus securely and non-rotatably attaching the plastic steering member to the metal steering rod with a metal-to-metal contact on each side of the central hub.

---

This invention relates generally to vehicle steering assemblies, and more particularly it relates to a unitary plastic steering member designed for coupling to the metal steering rod of a small vehicle.

The term "small vehicle" as used herein is intended particularly to comprehend that class of items including small autos, small tractors, small racing cars, steerable sleds, bicycles, tricycles, and so on, which are designed for and intended to be used by children in the age category of 3 to 7 years. However, it must be recognized that while this is the particular environment or category for which the present invention is intended, the principles of the present invention are in no way limited to use in this particular environment, or on small vehicles of the type hereinabove described. Similarly, the term "steering member" as used herein, is intended to refer particularly to steering wheels, but again, any steering or guiding member is intended to be comprehended by this definition.

In the general class of small vehicles, as that term is defined hereinabove, it is customary to provide an upstanding metal steering rod which, when actuated, effects a movement of the steering mechanism on the vehicle. Those familiar with the art of small vehicles of this type have long recognized that it would be extremely desirable and beneficial for several reasons, to provide such a metal steering rod with a plastic steering member or wheel. One reason that plastic has been considered desirable as a material for fabrication of the steering member is that the same lends itself to ease of manufacture which enables a producer to create attractive and intricate steering members on a mass production basis and at relatively inexpensive costs.

Another reason for the desirability of providing a plastic steering member is because of the safety aspects thereof. That is, it must be remembered that wheels of this type are used on vehicles operated by small children, and the use of a plastic steering member would assure that even if a child were to inadvertently fall or bump against the steering member, such child would not be seriously hurt. Still another reason for the desirability of using plastic material for the steering member lies in the fact that plastic has a more pleasant feel to the touch than does steel or other metallic material.

Considering then the foregoing factors, it should be apparent that those skilled in the art recognized the desirability of the utilization of a plastic steering member, and recognized the many benefits attendant thereto. However, prior to the present invention, no satisfactory means were devised for coupling a plastic steering member to a metal steering rod, and attempts made along this line were wholly unsuccessful. Such prior art attempts to attach a plastic steering wheel to a metal steering rod, or even the generally used technique to attach a metal steering wheel to a metal steering rod, utilized a transversely extending nut and bolt arrangement which passed through the steering rod and the hub of the steering wheel. However, as soon as the wheel was turned a few times, the nut and bolt started to loosen up and before long, the same was loosened to a condition whereat the steering wheel was only loosely coupled to the steering member, and where the steering itself was thus wobbly and unsatisfactory. Furthermore, those who did attempt to use plastic steering members in connection with metal steering rods, found that the plastic soon became worn away where it fit against the metal part, thereby again causing a loosened coupling condition between the wheel and the steering rod. It is important to remember that when a child is sitting in a vehicle which he is attempting to turn or steer, the child's weight is a force acting downwardly upon the vehicle and causing the same to tend to resist any turning. Thus, to accomplish the desired turning or steering, a specific value of force must be imparted via the steering wheel and the steering rod down to the steering mechanism, and this force must be great enough to accomplish the desired turning or steering. Naturally, if the connection between the steering wheel and the steering rod is a loose or faulty one, much of the force imparted to the steering wheel is not transmitted to the steering rod, and accordingly, turning or steering cannot be efficiently accomplished.

With the foregoing factors firmly in mind, it is, therefore, an object of the present invention to overcome the difficulties and shortcomings associated with the prior art, and in their stead, to provide an improved vehicle steering assembly.

Another object of the present invention is to provide a means for satisfactorily coupling a plastic steering member to a metal steering rod of a small vehicle or the like.

Another object of the present invention is to provide a plastic steering member designed to compatibly interfit with a metal steering rod, which plastic steering member can be simply and easily attached to the existing steering rod of small vehicles.

Another object of the present invention is to provide an assembly of a plastic steering wheel and a metal steering rod, which assembly will remain firm and efficient and will not loosen during usage.

Another object of the present invention is to provide an inexpensive, yet efficient, assembly of parts which can be cooperatively fit together to create a firm and efficient steering assembly for a small vehicle.

Other objects, advantages and salient features of the present invention will become apparent from the following detailed description, which, taken in conjunction with the annexed drawings, discloses a preferred embodiment hereof.

The foregoing objects are attained by providing a plastic steering member having a central hub with a non-circular bore extending therethrough. Two metal locking elements are provided, one juxtaposed to each face of the hub, and each metal locking element has a non-circular aperture therein, congruent with and in alignment with the non-circular bore through the hub. The metal steering rod is provided with a non-circular portion which projects through the respective apertures and bore in the metal locking elements and hub and threads are provided on at least the projecting part of this non-circular portion for receiving a locking nut. The steering rod includes metal abutment means adjacent the non-circular portion and when the entire unit is assembled, one of the metal locking members abuts against the metal abutment means and the other locking member abuts against the locking nut. As the locking nut is tightened, the plastic steering member is thus securely and non-rotatably coupled to the steering rod with a metal-to-metal contact being present on each side of the central hub.

Referring to the drawings.

Figure 1:
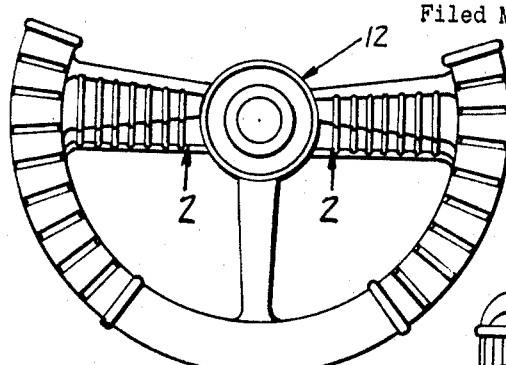
FIGURE 1 is a top plan view of a typical plastic steering member for a small vehicle.
Figure 5:
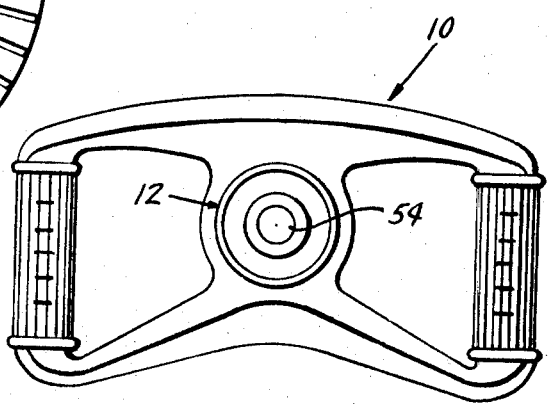
FIGURE 5 is a top plan view of another form of plastic steering member suitable for use in the present invention.

Referring now to the drawings for a more detailed description of the present invention, there is shown in FIGURE 1 and in FIGURE 5 a typical plastic steering member adapted for use with small vehicles, such steering member being generally designated 10. While the member 10 can be fabricated of any suitable plastic material, linear polyethylene has been found to be satisfactory because of its low cost, ease of fabrication, and its qualities of inertness and stability. Naturally, the member 10 can be fabricated by any suitable production means, as, for example, injection molding. It will be appreciated that the member 10 is a unitary integral item formed as a single piece in a single operation, and thus the same can be produced relatively inexpensively, yet can have a high degree of attractiveness.

Each member 10 is provided with a central hub generally designated 12 which is utilized to attach the member to a metal steering rod generally designated 14 projecting from a small vehicle. As aforesaid, the invention is not particularly concerned with what type of small vehicle is utilized, and instead, the steering rod 14 shown in FIGURE 2 can be considered to be extending in upstanding relationship from any type of small vehicle.

Figure 2:
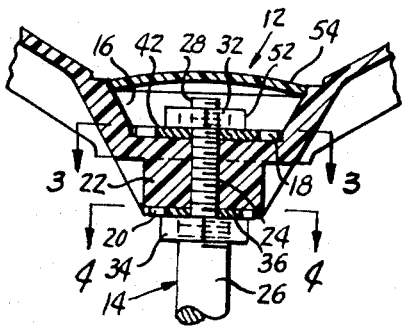
FIGURE 2 is a fragmentary sectional view taken substantially along the line 2—2 of FIGURE 1.
Figure 6:
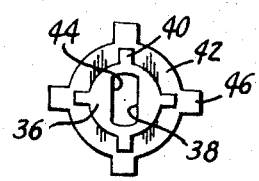
FIGURE 6 is a bottom plan view of the two locking elements utilized in the present invention, such locking elements being shown in their normal superposed relationship; and, FIGURE 7 is a fragmentary sectional view of a modified embodiment of the present invention.

As best shown in FIGURE 2, the construction of the central hub 12 includes a recess 16 at the outer portion thereof and a flat face 18 at the bottom of the recess forming the outer face of the hub. A somewhat smaller parallel and opposed face 20 forms the inner face of the hub 12. In the body portion 22 which forms the solid portion of the hub between the opposed faces 18 and 20, a non-circular bore or recess 24 is provided, with such recess extending fully between the inner and outer faces.

Figure 3:
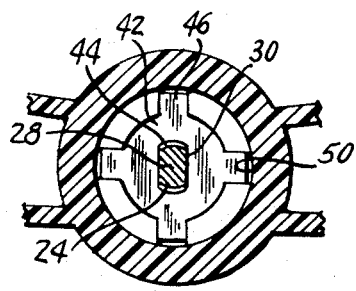
FIGURE 3 is a sectional view taken substantially along the line 3—3 of FIGURE 2.
Figure 4:
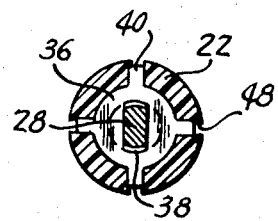
FIGURE 4 is a sectional view taken substantially along the line 4—4 of FIGURE 2.

The steering rod 14 is generally, though not necessarily, formed as a cylindrical metal rod 26, but at its upper end, the steering rod is provided with a non-circular portion 28 having a size and configuration which permits insertion through the non-circular bore 24. As can best be seen from FIGURES 3 and 4, the non-circular portion 28 of the steering rod is formed by milling away two sides thereof to produce a pair of spaced parallel flat side walls 30. The non-circular portion 28 of the steering rod is provided at 32 with screw threads, such screw threads extending about those partially circular portions extending between the flat side walls 30, and further extending downwardly past the non-circular portion and on to the cylindrical portion 26.

In order to support the steering member 10 on the steering rod 14, some suitable support or abutment means must be provided, and to this end, a metal abutment means in the form of a nut 34 is utilized, such nut being attached to the screw threads 32 along the cylindrical portion 26 of the steering rod. In other words, the metal abutment means or nut 34 is adjacent the non-circular portion 28 of the steering rod.

Metallic locking elements are also provided to aid in coupling the steering member 10 to the steering rod 14. Each of such locking elements is formed as a flat metal washer and each has a central hole therein of the same non-circular configuration as the bore 24 to thereby facilitate passage of the non-circular portion 28 of the steering rod 14. The first or smaller locking element is designated 36, is provided with a non-circular central aperture 38 corresponding in size and configuration to a cross-section of the bore 24, and is also provided with at least one and preferably a plurality of radially projecting wing elements 40. The second or larger metal locking element is designated 42, includes a non-circular central aperture 44 substantially identical to the aperture 38, and also includes at least one and preferably more than one radially projecting wing means 46.

The first or smaller metal locking element 36 is intended to be disposed between the inner face 20 of the hub and the metal abutment means or nut 34 on the steering rod portion 26. To accomplish this, slots or recesses 48 are provided in the outer face 20 in properly spaced relationship and of a proper size to permit the reception of the radially projecting wing portions 40 extending from the locking element 36. Thus, when the locking element is inserted into position, in the manner shown in FIGURES 2 and 4, the wing means 40 lock into the slot 48, thereby assuring that the locking member 36 cannot inadvertently turn or rotate.

The second or large locking element 42 is intended to be juxtaposed to the outer face 18 of the hub, and to permit this, slots or grooves 50 are formed therein of a sufficient size and shape to permit reception of the wing means 46 extending from the locking element 42. When the locking element 42 is thus placed in position, in the manner shown in FIGURES 2 and 3, the wing means 46 fit into the slots 50 thereby assuring that the locking element cannot inadvertently turn or rotate.

The manner of assembly can best be understood and appreciated by reference to FIGURE 2 wherein it can be seen that, with the locking elements placed in position on their corresponding faces of the hub, the non-circular portion 28 of the steering rod is then passed upwardly therethrough, such portion passing first through the aperture 38 in the first locking element, then through the central bore 24 in the body 22 of the hub, and finally through the aperture 44 in the second locking element 42. After the non-circular portion 28 has been positioned in this manner, it will be seen that the steering member 10 is basically supported on the shaft by the abutment means or nut 34 threaded thereon. The non-circular portion 28 has sufficient length to assure that the same will extend above the second locking element 42 and into the recess 16 in the hub.

To complete the locking assembly, a locking nut 52 is threaded onto the screw threads 32 on the non-circular portion 28 which is disposed within the recess 16. As this locking nut 52 is tightened, it presses against the second metal locking element 42 to force the same tightly against the outer face 18 of the hub. Simultaneously, such tightening of the locking nut 52 causes the metal abutment means or nut 34 to press tightly against the first locking element 36, thereby forcing the same against the inner face 20 of the hub. It will thus be seen that on each side of the central hub body 22, there is a metal-to-metal contact, thus assuring that the plastic steering member 10 will be firmly and tightly engaged upon the metal steering rod 14, and that the connection or coupling therebetween will not loosen during usage.

For decorative effect, a plastic snap disc 54 may be utilized as a cover for the recess 16. In this way, the locking nut 52 and upper portion of the non-circular steering rod portion 28 will not be visible.

Although the outer face 18 and its corresponding locking element 42 have been shown and described as being somewhat larger than the inner face 20 and its corresponding locking element 36, it will, of course, be appreciated that this relationship is not critical insofar as the inventive concept is concerned. However, since the outer face and locking element do provide the primary locking function, and do receive the primary locking force directly from the locking nut 52, it has been found efficient to make the same somewhat larger than the inner face and its locking element.

Figure 7:
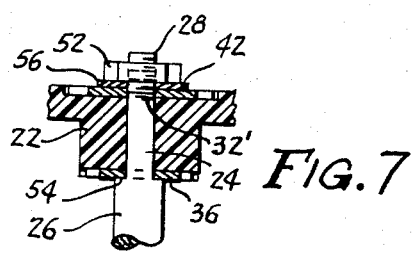

In the modified embodiment of FIGURE 7, the lower nut 34 is eliminated, and instead, the metal abutment surface is formed by shoulder means 54 where the non-circular portion 28 merges into the rod 26. It will be recalled that the flat side walls 30 were formed by milling away two sides of the rod and the shoulder means 54 is created at the end of the mill cut. Also, in the embodiment of FIGURE 7, it will be seen that modified screw threads 32' are provided, with such threads terminating short of the shoulder means 54. In the previously described embodiment, it was necessary to extend the screw threads 32 onto the cylindrical portion 26 to serve as a means for mounting the lower nut 34; however, since the nut 34 is eliminated in the embodiment of FIGURE 7, the screw threads need only extend part way along the non-circular portion 28.

It is also comprehended that means can be provided for preventing the lock nut 52 from inadvertently loosening. Such means can take the form of a lock washer 56 as shown in FIGURE 7 sandwiched between the locking nut 52 and locking element 42. The lock washer can be a split spring type lock washer, a star washer, or any other suitable form of lock washer. As an alternative to the use of a lock washer 56, the locking nut 52 itself can be of the self-locking type, such as an elastic stop nut or a "Nylock" nut, the latter being a nut with a nylon insert which bites into the screw threads as the nut is tightened down.

While the present invention has been described particularly in conjunction with a plastic steering member for a metal steering rod to be used on a small vehicle, it will be recognized and appreciated that such description is only by way of exemplification and not by way of limitation. That is, is should be recognized that the invention can find use and utility in other types of environments. As an example, the teachings and principles of the present invention might very well be utilized to attach a plastic ground engaging wheel to a metal axle for a small vehicle or the like.

After reading the foregoing detailed description it should be apparent that the objects set forth at the outset of the specification have been successfully achieved by the present invention. Accordingly,

What is claimed is:

1. The improvement in coupling a plastic steering member to a metal steering rod of a small vehicle or the like, which comprises:

said plastic steering member having a central hub with opposed inner and outer faces;

said central hub having a non-circular bore extending therethrough between said inner and outer faces;

said steering rod having a non-circular portion at the upper end thereof to permit insertion through said non-circular bore;

metal abutment means on said steering rod adjacent said non-circular portion;

a first metal locking element disposed between said metal abutment means and said hub inner face;

a second metal locking element juxtaposed to said hub outer face;

each of said metal locking elements having a non-circular aperture therein congruent with, and axially aligned with, said non-circular bore;

said steering rod non-circular portion extending through said non-circular bore and each of said non-circular apertures thus preventing said central hub and said first and second metal locking elements from rotating relatively to one another;

each of said metal locking elements including at least one peripheral projection;

said inner and outer faces of said central hub each including slot means therein for receiving and accommodating their respective locking element peripheral projections;

said engagement of said peripheral projections in said slot means thus serving as a further means for preventing relative rotation between said first and second metal locking elements and said central hub;

said steering rod non-circular portion having a part thereof projecting beyond said second metal locking element, said projecting part being threaded;

a locking nut engageable with said threaded projecting part of said steering rod;

said locking nut being tightenable to press against said second metal locking element to force the same against said outer face while simultaneously causing said metal abutment means to press against said first metal locking element to force the same against said inner face, thereby securely coupling said plastic steering member to said metal steering rod by a metal-to-metal contact on each side of said steering member central hub.

2. The improvement defined in claim 1 wherein said peripheral projections on said locking elements are radially extending wings and wherein said first and second metal locking element wings are aligned with one another axially of said steering rod.

3. The improvement defined in claim 1 wherein the radial size of said outer face and second locking element exceeds that of said inner face and first locking element.

References Cited

UNITED STATES PATENTS

| 1,340,604 | 5/1920 | Fulton | 287—53 |
| 1,958,165 | 5/1934 | Le Compte | 16—121 XR |
| 2,105,616 | 1/1938 | Shaw | 287—53 XR |
| 2,644,858 | 7/1953 | Small | 74—552 XR |
| 2,828,645 | 4/1958 | Wilfert | 74—552 XR |
| 3,298,722 | 1/1967 | Remaley | 74—548 XR |

FOREIGN PATENTS 1,278,063  10/1961  France.

CARL W. TOMLIN, *Primary Examiner.*

A. KUNDRAT, *Assistant Examiner.*

U.S. Cl. X.R.

74—548